Jan. 24, 1961

J. T. BANGERT 2,969,509

MINIMUM-PHASE WAVE TRANSMISSION NETWORK WITH MAXIMALLY FLAT DELAY

Filed Nov. 19, 1958

INVENTOR
J. T. BANGERT
BY
Ralph P. Holcomb
ATTORNEY

United States Patent Office 2,969,509

Patented Jan. 24, 1961

2,969,509

MINIMUM-PHASE WAVE TRANSMISSION NETWORK WITH MAXIMALLY FLAT DELAY

John T. Bangert, Chatham, N.J., assignor to Bell Telephone Laboratories, Incorporated, New York, N.Y., a corporation of New York Filed Nov. 19, 1958, Ser. No. 774,866

1 Claim. (Cl. 333—28)

This invention relates to wave transmission networks and more particularly to frequency-discriminatory networks of the constant-resistance, minimum-phase type with maximally-flat delay.

The object of the invention is to improve the unit-step response of a two-port, frequency-discriminatory network having a constant-resistance image impedance at each port. More specifically, the object is to eliminate overshoot and ripple in the unit-step response of such a network.

Special requirements apply to two-port, wave transmission networks intended for use in systems which must faithfully transmit rectangular or steep-fronted pulses. One usual requirement is that the image impedance at each port must be substantially a constant, pure resistance at all frequencies of interest, both within and without the transmission band. Another important requirement is that the amplitude response to a rectangular pulse, on a time basis, should be free from objectionable overshoot or ripples. It is known that a minimum-phase network having a maximally-flat delay characteristic will have a satisfactory unit-step response. Some constant-resistance networks of this type heretofore known have minimum phase, but none have maximally-flat delay.

The present invention overcomes this difficulty in a composite, frequency-discriminatory network which includes a wave filter and a shaping network, each of the constant-resistance, minimum-phase type. The shaping network has a delay characteristic which substantially compensates for the departure of the filter from the maximally-flat type throughout the transmission band of the filter. Thus, the composite structure is constant-resistance at each port and has an excellent step-response characteristic.

The filter, which largely determines the insertion loss-frequency characteristic of the composite network, may be of the low-pass, high-pass, band-pass, or band-elimination type. The bridge-type, constant-resistance, minimum-phase filters disclosed in Patent 2,043,345, to S. Bobis, issued June 9, 1936, are preferred because they are minimum phase and may be built in the unbalanced form with a minimum number of elements. The shaping network is preferably a constant-resistance, bridged-T structure of the type disclosed in Patent 1,606,817, to G. H. Stevenson, issued November 16, 1926, which is also minimum phase and may be constructed in the unbalanced form.

The nature of the invention and its various objects, features, and advantages will appear more fully in the following detailed description of a typical embodiment illustrated in the accompanying drawing, of which Fig. 1 is a block diagram of a composite, frequency-discriminatory, wave transmission network in accordance with the invention;

Figure 1:
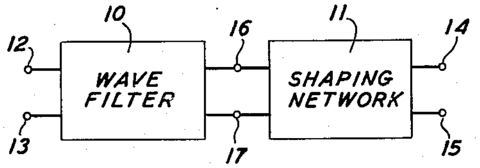

As shown in Fig. 1, the composite network comprises a wave filter 10 and a shaping network 11 connected in tandem between a pair of input terminals 12, 13 and a pair of output terminals 14, 15, with intermediate, common terminals 16, 17. The filter 10 and the network 11 are each of the constant-resistance, minimum-phase type.

Figure 2:
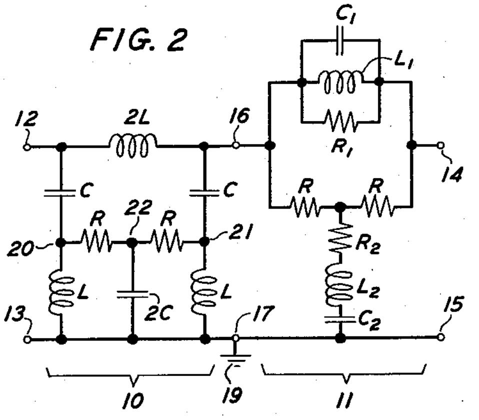
Fig. 2 is a schematic circuit of an embodiment of the network of Fig. 1 in a low-pass filter.
Figure 4:
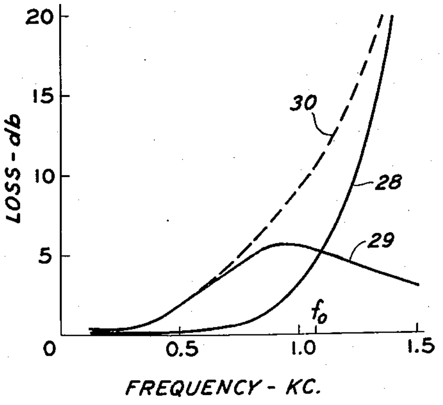
Fig. 4 shows the corresponding insertion loss-frequency characteristics for the filter, the shaping network, and the over-all network.

In the embodiment shown in Fig. 2, the filter 10 is an unbalanced, low-pass structure of the type disclosed in Fig. 4 of the above-mentioned Bobis patent. The terminals 13, 15, and 17 may be grounded, as indicated at 19. The circuit comprises two resistors, each having a value R equal to the image impedance at each end, three inductors, and three capacitors. Two of the inductors each have a value L, and the third a value of 2L, where $$L=R/\sqrt{2}\omega_0 \quad (1)$$

$$\omega_0=2\pi f_0 \quad (2)$$

and $f_0$ is the nominal cut-off frequency of the filter 10. Two of the capacitors each have a value C given by $$C=L/R^2=1/\sqrt{2}R\omega_0 \quad (3)$$

and the third has a value of 2C.

The inductor 2L is in a bridging branch connected between the high-side input terminal 12 and the corresponding intermediate terminal 16. A shunt impedance branch comprising C and L in series, with L grounded, is connected between the input terminals 12 and 13. A similar shunt branch is connected between the intermediate terminals 16 and 17. The resistors are connected in series between the midpoints 20 and 21 of the two shunt branches. The capacitor 2C is connected between the common terminal 22 of the resistors and ground.

The shaping network 11 in this embodiment is an unbalanced, bridged T structure of the type disclosed in the Stevenson patent mentioned above. The circuit comprises two series resistors each of value R, and interposed shunt branch, and a bridging branch. The bridging branch includes a capacitor of value $C_1$, an inductor of value $L_1$, and a resistor of value $R_1$ connected in parallel between an intermediate terminal 16 and an output terminal 14. The shunt branch is made up of the series combination of a resistor $R_2$, and inductor $L_2$, and a capacitor $C_2$.

Figure 3:
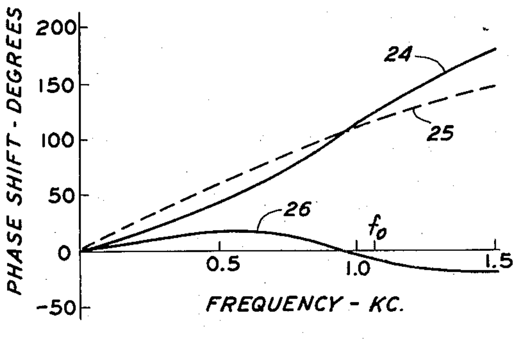
Fig. 3 shows typical phase shift-frequency characteristics for the filter, the shaping network, and the composite structure of Fig. 2.

It is recognized that a minimum-phase network with maximally-flat delay will have a unit-step response substantially without overshoot or ripple. The curve 24 of Fig. 3 shows the phase shift-frequency characteristic of the filter 10 when $f_0$ is 1.06 kilocycles. The broken-line curve 25 shows the phase characteristic required for a maximally-flat delay from zero frequency to $f_0$. It will be seen that the curve is substantially linear throughout most of the transmission band, but departs more and more from linearity in the neighborhood of $f_0$ and above. The corresponding delay characteristic will be substantially flat and without ripples over a large part of the pass band but will round off smoothly and monotonically as the cut-off is approached. The flat portion may be extended by increasing the number or complexity of the sections in the composite network. The curve 26 shows the difference between the curves 24 and 25, and therefore the required phase shift for the shaping network 11. The curve 26 will be closely matched if the component elements have the following values:

$$C_1 = 1/ab\omega_0 A \quad (4)$$
$$C_2 = a/b\omega_0 R \quad (5)$$
$$L_1 = aR/b\omega_0 \quad (6)$$
$$L_2 = R/ab\omega_0 \quad (7)$$
$$R_1 = R/g \quad (8)$$
$$R_2 = gR \quad (9)$$

where $a$, $b$, and $g$ are equal, respectively, to 0.655, 0.908, and 1.05.

In Fig. 4, the curves 28, 29, and 30 show the insertion loss-frequency characteristics, respectively, for the filter 10 alone, the shaping network 11 alone, and the composite structure. In a minimum-phase structure, the loss is uniquely related to the phase shift. Therefore, if desired, the shaping network 11 may be designed to have the loss shown by the curve 29. Then, the phase shift will be as shown by the curve 26 of Fig. 3, and the delay will be maximally flat, as desired.

Figure 5:
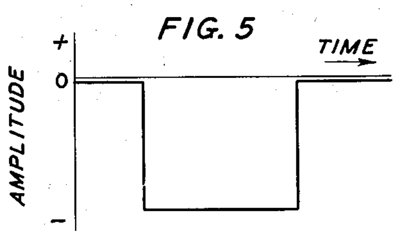
Fig. 5 represents a rectangular voltage pulse used in testing the network.
Figure 6:
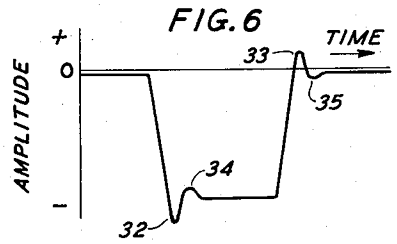
Figs. 6 and 7 show the amplitude response-time characteristics obtained at the output end of the filter alone and of the composite network, respectively, when the pulse of Fig. 5 is applied to the input terminals.
Figure 7:
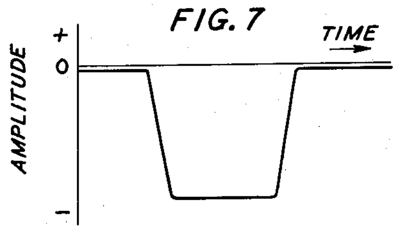

The improvement obtained by adding the shaping network 11 is apparent from a comparison of the amplitude response-time characteristics shown in Figs. 6 and 7. In each case, a negative voltage pulse, of the type shown in Fig. 5, was applied for approximately 0.004 second to the input terminals 12 and 13. Fig. 6 shows the response at the intermediate terminals 16 and 17, with the shaping network 11 removed. The overshoot at the points 32 and 33 is about 14 percent, and disturbing ripples appear at the points 34 and 35. Fig. 7 shows the response at the output terminals 14 and 15, with the network 11 added. It is seen that the overshoot and the ripples have been reduced to a negligible value.

It is to be understood that the above-described arrangement is only illustrative of the application of the principles of the invention. Numerous other arrangements may be devised by those skilled in the art without departing from the spirit and scope of the invention.

What is claimed is:

A frequency-discriminatory wave transmission network of the minimum-phase type with a constant-resistance image impedance at each end and a maximally-flat delay comprising the tandem-connected combination of a wave filter and a shaping network each of the minimum-phase type and each having at each end an image impedance which is a substantially constant resistance at all frequencies, the filter having a delay characteristic which departs from maximum flatness and the shaping network having a delay characteristic which subtantially compensates for this departure throughout the transmission band of the filter, whereby the composite Network has both the proper insertion loss and the proper phase shift to eliminate substantially all overshoot and ripple in its unit-step response.

References Cited in the file of this patent

UNITED STATES PATENTS

| | | |
|---|---|---|
| 1,606,817 | Stevenson | Nov. 16, 1926 |
| 2,043,345 | Bobis | June 9, 1936 |
| 2,181,499 | Wheeler | Nov. 28, 1939 |
| 2,450,352 | Piety | Sept. 28, 1948 |
| 2,718,622 | Harkless | Sept. 20, 1955 |

OTHER REFERENCES

Storch: Proceedings of the I.R.E., vol. 42, No. 11, November 1954, pages 1666–1675.